United States Patent Office 3,584,342
Patented June 15, 1971

3,584,342
ROTARY PLATE TYPE EXTRUDER
Bernard Neuville, Versailles, France, assignor to Produits Chimiques Pechiney-Saint-Gobain, Neuilly-sur-Seine, France
Filed Oct. 3, 1968, Ser. No. 764,860
Claims priority, application France, Oct. 12, 1967, 124,231
Int. Cl. B29f 3/00
U.S. Cl. 18—12SM                           11 Claims

ABSTRACT OF THE DISCLOSURE

A rotary plate type extruder having spaced surfaces with a gap between and with an extrusion opening through an axial portion of one of the plates and in which the surface in the central axial portion of at least one of the plates is recessed to increase the width of the gap in communication with the extrusion opening.

---

This invention relates to extruders of the rotating disc type which make use of the Weisenberger effect for the centripetal displacement of thermoplastic materials in response to relative rotational movement between the spaced surfaces of plates and this invention relates more particularly to the problems of extruding shapes of relatively large cross sections.

Extruders of the type described have been designed with various modifications. In general they comprise a pair of plates having their inner surfaces in spaced parallel relation with one of the plates mounted for rotational movement relative to the other. Plastic material fed into the gap between the plates is rapidly reduced to a plastic or gel state and homogenized as it is displaced radially inwardly to an extrusion opening through one of the plates, preferably the stationary plate or stator. For a more detailed description, reference can be made to U.S. Pat. No. 3,364,-522, issued Jan. 23, 1968, and entitled "Plastic Extrusion Machine" and to the copending application Ser. No. 584,-438, filed Oct. 5, 1966, and entitled, "Plastic Extrusion Machine," wherein the former describes an extruder suitable for use in the extrusion of unplasticized polyvinyl chloride while the latter describes an improvement that enables the extrusion of unplasticized polyvinyl chloride and the like plastic materials through die openings of small cross sections, as in the production of filaments and the like.

Apparatus of the type described imposes an intensive shearing action on the plastic material whereby the plastic material becomes degasified and homogenized while being raised to a temperature sufficient to reduce the plastic material to a plastic or gel state of relatively low viscosity and sufficiently rapidly to avoid thermal degradation of the plastic material even when extruding such thermally unstable materials as polyvinyl chloride.

Because of the high temperature and low viscosity of the thermoplastic material processed through the rotary disc extruder of the type described, it is difficult and oftentimes impossible to extrude the material into shapes of large cross section since the thermoplastic material extruded is generally characterized by poor heat conductivity. Since cooling occurs first in the outer portions of the extruded product and the temperature in the interior portions decreases very slowly, considerable time elapses before the extruded product can take on and retain a definite fixed shape. In addition, thermal degradation can occur in the interior portions of the extruded product which remain at high temperature for a longer period of time.

It is an object of this invention to obviate the disadvantages of the type described in a disc extruder whereby the apparatus can be operated efficiently and effectively to extrude even thermally unstable thermoplastic materials into shapes of large cross section.

These and other objects of this invention will hereinafter appear and for purposes of illustration, but not of limitation, an embodiment of the invention is shown in the accompanying drawings, in which.

Figure 1:
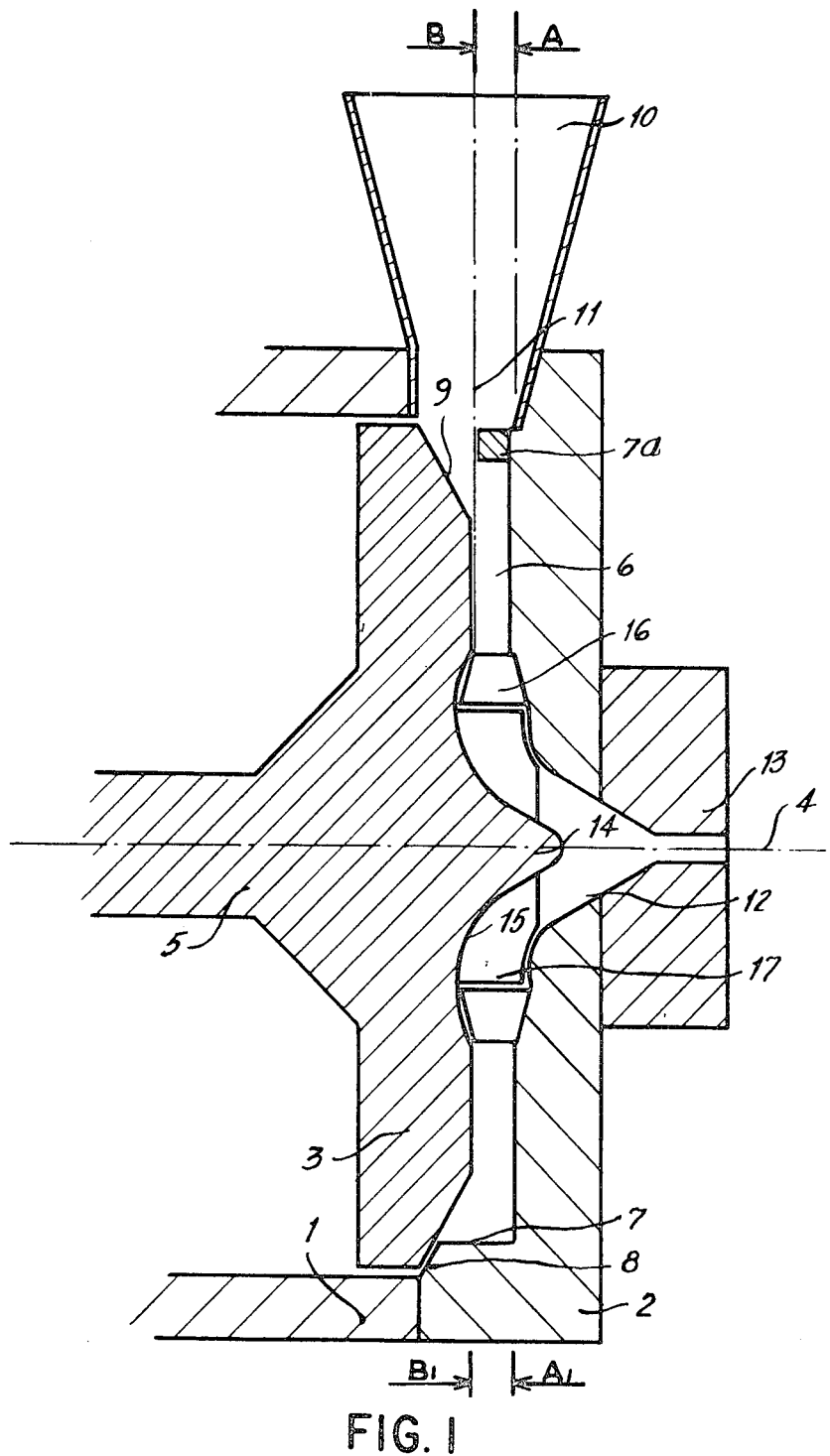
FIG. 1 is a side elevational view in section of the extrusion apparatus embodying the features of this invention.

It has been found, in accordance with the practice of this invention, that the described objects can be achieved by providing recessed portions or hollowed portions in the surfaces adjacent the axial passage connecting the extrusion die with the gap between the facing surfaces of the plates. The thermoplastic material introduced into the extruder in the form of a powder or granules has a certain apparent density. As the material begins to be reduced to the plastic state and becomes degrassed, the density increases. The material travels through the gap between the plates in a roughly spiral path and the section that it meets at any moment, proportional to its distance to the center of rotation and the thickness or width of the gap, decreases in the same direction as the volume of the composition, when the width of the gap remains constant.

The improvement of this invention, which consists in increasing the width of the gap in the central portion, has shown, to our surprise, that it permits a reduction of shearing intensity to which the material is subjected during passage through the area by comparison with the same extruder without the described recessed portions in the central zone, this being achieved without loss in homogeneity or ability to produce shaped extruded articles while also providing for a higher rate of flow. The improvement also results in lowering the temperature due to frictional forces whereby it becomes possible to form the material to desired shapes with less risk of degradation since the exposure time at high temperature is markedly reduced.

The described increase in gap thickness in the central zone between the disc plates should be such that the material displaced through the gap for extrusion encounters a section which is continuously decreasing, although the decrease is not constant but lesser in the central area of the gap. This section, at a distance $d$ from the axis of a gap having a thickness $e$, is proportional to $2\pi de$. Thus one can calculate $e$ for a given value of $d$ such that $2\pi de$ decreases perpendicularly as distinguished from linearity with $d$.

The effect of increase in thickness of the gap in the central zone on the temperature of the material extruded occurs even for small depths of the recessed portions of the plate but the drop in temperature increases with the thickness of the gap.

The zone of increased thickness or gap width may comprise the entire working area of the plates including the peripheral portion to the axis. However, it is important for the plates to exert an intensive shearing action through their major portion. As a result, a gap of low thickness is desirable in the largest section defined in the outer peripheral portion of the plates. Preferably the zone of larger thickness may be defined as one having a radius less than that of the area inside of which, for a gap of constant thickness, the ratio of the section presenting itself to the material while in a plastic state to the section available for the material at its inlet in the shear zone, becomes less than the ratio of apparent density of the particulate feed to that of the material in the sheared or plastic state. For example, in an extruder having flat, parallel spaced surfaces, if the ratio of apparent densities of the feed material to the gelled material is 1 to 3, the section available for the material to be extruded becomes ⅓ the section available for the material at the inlet of the shearing zone when the distance to the excess is $R/3$, with R representing the radius of the gap. It is in this axial portion in which the cavity or recess defining increased width of gap is provided. In this instance, the gap is assimilated to a cylinder. Small variations in shape of the recessed portion have negligible effect. The recessed zone should have a surface larger than that of the internal orifice of the passage that connects the gap to the die.

The profile of the central cavity can be rectilinear or curved inwardly slightly and the recessed portions can be provided on only one or on both of the plates.

It will be obvious from the foregoing that the concept of this invention resides in the general shape of the plates and that the latter may be formed with various embossments, either in the axial tip portion or in the recessed or cavity portion. Grooves may be formed in the plates without departing from the spirit or scope of the invention.

More particularly, the plates can be formed with grooves, as described in the copending application filed on or about Sept. 11, 1968, entitled "Improvements in Extruders With Rotating Plate." Such grooved plates find particular use in the extrusion of material containing a lubricating substance.

Referring now to the drawings for a description of a disc plate extruder embodying the features of this invention, 1 represents the frame of the extrusion apparatus with the stator 2 fixed onto the end thereof. A rotor 3 is mounted with its inner face parallel to the inner face of the stator for rotational movement about its axis 4 relative thereto, as by a motor and a variable speed gear of conventional construction and connected operatively to engage the shaft 5 on which the rotor is mounted. The stator 2 is cut out on its inner side to define a cavity 6 confined at its sides by wall 7 having an inner surface which defines a cylindrical section arranged eccentric to the rotor axis and having a radius slightly less than that of the rotor. The rims of the stator and rotor are formed with bevels 8 and 9 for nesting the one in the other with a minimum of clearance therebetween. The frusto-conical surfaces defined by the chamfered portions are coaxial with the rotor.

A feed hopper 10 communicates with a feed opening 11 which is partially confronted by a prolongation 7a of the chamfered gap edge 7 in the upper and most eccentric portion of the gap between the surfaces of the plates.

The stator is provided with a frusto-conical passage 12 coaxial with the rotor 3 and which leads into the die 13 mounted on the outside of the stator.

The rotor is formed with a central tip 14 which projects forwardly beyond the face of the rotor to extend partially into the frusto-conically shaped passage 12. The axial tip portion 14 is surrounded by a slightly recessed portion 15 in accordance with the practice of this invention.

Blades 16, fixed to the inner face of the stator 2, extend into the gap from the slightly recessed portion of the stator which is contiguous with the recessed portion 15 in the rotor. Blades 17, fixed to the recessed portion of the rotor, extend in the radial direction from the lip portion of the rotor into the gap for a distance short of the inner edge of the blades 16 fixed to the stator. The blades 16 and 17 are dimensioned to have a length substantially to span the gap between the plates and preferably terminating immediately in advance of the surface of the opposite plate for maximum effect. Thus the blades 16 are disposed radially outwardly of the blades 17 and offset therefrom to avoid interengagement.

Figure 2:
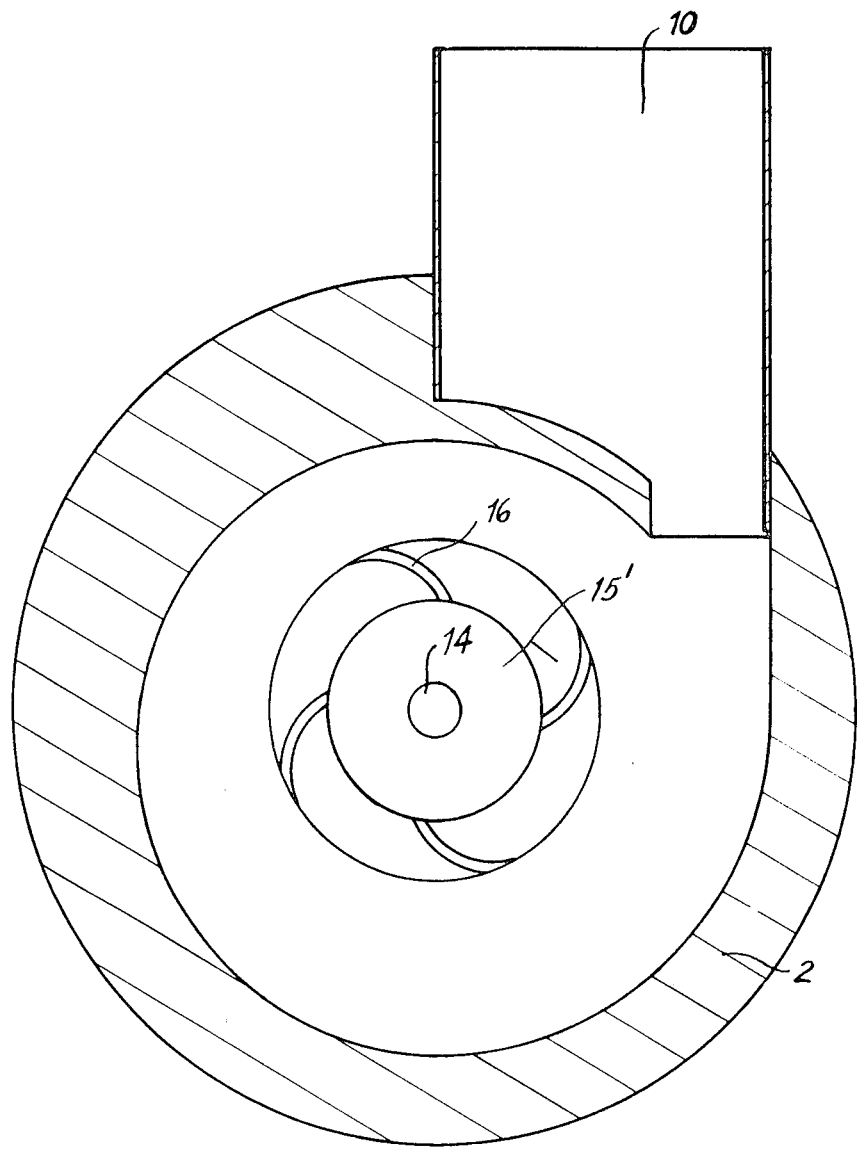
FIG. 2 is a sectional view taken along the line A—A of FIG. 1.

FIG. 2 shows the stator 2 with the passage 12 coaxial with the rotor 3. The blades 16 are located within a recessed portion 16a of the stator concentric with the passage 12 and contiguous with the recessed portion 15 of the rotor with the blades 16 being curvilinear in their lengthwise direction.

Figure 3:
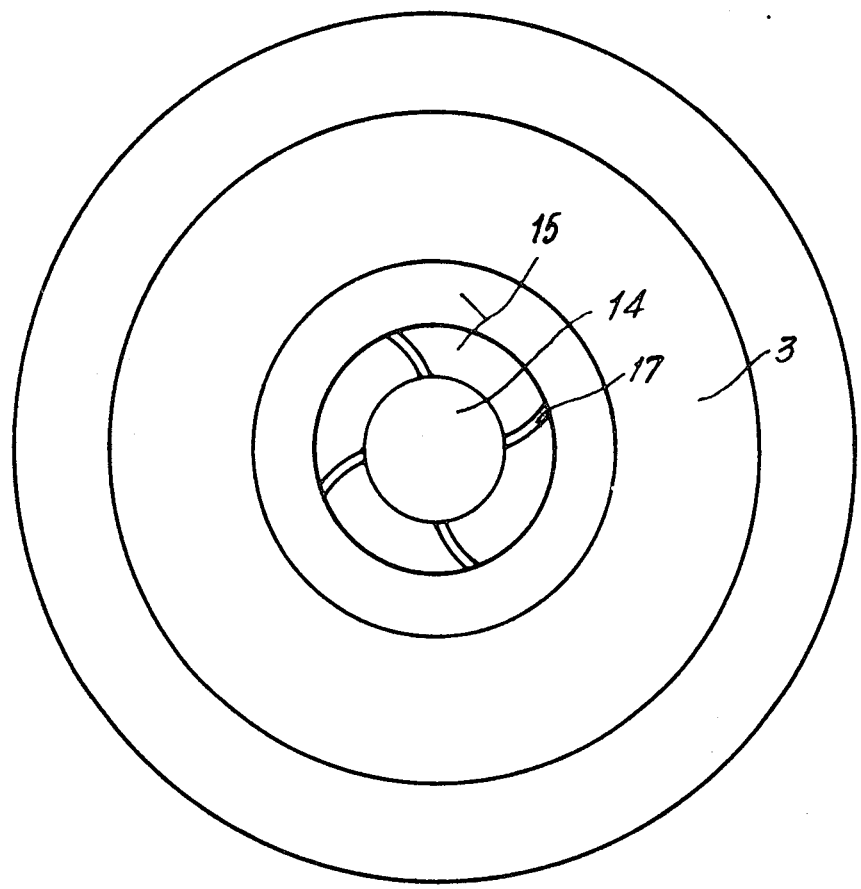
FIG. 3 is a sectional view taken along the line B—B of FIG. 1.

FIG. 3 shows the rotor 3 with its recessed portion 15 surrounding the frusto-conical protuberance 14 with the curvilinear blades 17 located in the recessed portions.

The following examples are given by way of illustration, but not by way of limitation:

EXAMPLE 1

This example, which makes use of a rotating disc extruder of the type described, is without the improvement forming the subject matter of this invention and it is given by way of comparison.

The rotor has a diameter of 180 mm. and a chamfer at the periphery having a slope of 30° C. at the surface of the plate and is 15 mm. wide. A frusto-conical tip 14 is provided at the center having a height of 50 mm. and a diameter at the base of 40 mm. Four deflection blades 17 extend from the base of the tip to a concentric circle having a diameter of 60 mm.

The rotor has a diameter of 180 mm. and a chamfer at ing a circumference at the base of 50 mm. in diameter. The stator is provided with blades 16 having their internal and external ends on circumferences coaxial with the rotor and having a diameter of 60 and 86 mm. respectively. The gap thickness between the inner faces of the rotor and stator is 5 mm. and the height of the blades is 4.5 mm.

The die has a bore diameter of 8.5 mm. in which a mandrel of 6 mm. diameter is concentrically arranged. A standard device for tube conformation is located at the exit of the die.

After initially heating the plates to 190° C. and the die to 200° C. by means of electrical resistance heaters located in the plates and die, normal extrusion operations are carried out. As the rotor is turned, a polyvinyl chloride resin, having a viscosity number Afnor of 80 (K value: 57), stabilized with 2 parts by weight of the glycolate per 100 parts by weight of polymer, is introduced through the feed hopper 10. After a few minutes of operation, heat input is no longer necessary and the resistance heaters are shut off.

At a rotational speed of 65 r.p.m., an output of 16 kg. per hour is obtained with the temperature of the plastic at the exit from the die being 220° C. At rotation speeds of 80 r.p.m., the output increases to 20.5 kg. per hour and the exit temperature increases to 230° C. At a rotational speed of 180 r.p.m., the output increases to 28.5 kg. per hour and the temperature at the exit rises to 245° C.

The tubing produced in this way does not retain the shape given to it by the die.

EXAMPLE 2

The same composition is extruded under the same conditions by the same apparatus as described in Example 1 except that the gap is enlarged in the central zone. The enlargement commences 43 mm. from the rotor axis and is symmetrical on both the rotor and stator except for the blades and the passage in the stator which leads to the die. The maximum thickness of the gap in the enlarged or recessed portions is at a concentric circle having a diameter of 60 mm. at which point the gap has a thickness of 7 mm. The height of the blades is increased to correspond with the increase in gap width so that the outer edges of the blades will be close to the surface of the opposite plate.

With this apparatus, for a rotational speed of 65 r.p.m., the output is 18 kg. per hour with an exit temperature of 215° C. For a rotor speed of 80 r.p.m., the output rises to 22.2 kg. per hour with an exit temperature of 215° C. For a rotor speed of 120 r.p.m., the output rises to 34.5 kg. per hour with an exit temperature of 225° C.

The tubing produced by Example 2 remains clear and homogeneous and it is able to retain its tubular shape.

It will be apparent from the foregoing that the improvement of this invention is effective to increase the yield and output of the extruder with less exit temperature so that extruded products of large cross sections can be produced with sufficient rigidity to retain shape.

It will be understood that changes may be made in the details of construction, arrangement and operation without departing from the spirit of the invention especially as defined in the following claims.

I claim:

1. An apparatus for the extrusion of plastic material comprising a housing having a stator in the form of a disc plate, a rotor in the form of a disc plate arranged with its face in spaced parallel relation with the face of the stator and mounted for rotational movement relative to the stator about an axis perpendicular to the spaced parallel faces, with the spaced relation between the faces of the stator and rotor providing an air gap which does not increase in width through at least the outer portions of the air gap therebetween, and an extrusion passage through an axial portion of one of the plates through which the material is extruded when reduced to a plastic state during movement through the gap between the plates, the improvement wherein at least one of the plates is formed on its inner surface with a recessed curvilinear concave portion about the central axis to increase the gap between the plates in communication with the extrusion passage.

2. An extruder as claimed in claim 1 in which the central recessed portion is in the rotor.

3. An extruder as claimed in claim 1 in which the central recessed portion is in the stator.

4. An extruder as claimed in claim 1 in which the central recessed portion is in both the rotor and stator with the recessed portions being contiguous one with the other.

5. An extruder as claimed in claim 1 in which the gap formed by the recessed portion decreases with the distance from the axis.

6. An extruder as claimed in claim 1 in which the ratio of maximum cross sectional area in the concave portion to the cross sectional area of the gap in advance of the concave portion is less than the ratio of the density of the unfused plastic material to the fused plastic material.

7. An extruder as claimed in claim 1 which includes angled grooves in the surfaces of the plates.

8. An extruder as claimed in claim 1 in which the extrusion passage is in the stator and which includes a frusto-conically shaped recessed portion leading into the extrusion passage.

9. An extruder as claimed in claim 8 in which the concave portion is outwardly but contiguous with the frusto-conically shaped portion leading into the extrusion passage.

10. An extruder as claimed in claim 1 which includes an axial protuberance extending forwardly from the surface of the rotor and which projects across the gap into a part of a frusto-conical opening of the stator.

11. An extruder as claimed in claim 1 which includes blades on the rotor and on the stator with the blades of the rotor extending in the radial direction from the central axis across a portion of the concave portion and in which the blades in the stator are concentrically arranged about the blades of the rotor and extend across a portion of the depressed portion with the blades dimensioned to have a length to almost span the gap between the plates.

References Cited
UNITED STATES PATENTS

| | | |
|---|---|---|
| 3,123,861 | 3/1964 | Westover. |
| 3,364,522 | 1/1968 | Ledoux. |
| 3,433,463 | 3/1969 | Pinney. |

ANDREW R. JUHASZ, Primary Examiner

L. GILDEN, Assistant Examiner

U.S. Cl. X.R.

18—30AF

UNITED STATES PATENT OFFICE
CERTIFICATE OF CORRECTION

Patent No. 3,584,342          Dated June 15, 1971

Inventor(s)  Bernard Neuville

It is certified that error appears in the above-identified patent and that said Letters Patent are hereby corrected as shown below:

Column 4, cancel line 23 and substitute -- The stator 2 is formed with a discharge opening hav- --.

Signed and sealed this 14th day of March 1972.

(SEAL)
Attest:

EDWARD M. FLETCHER, JR.
Attesting Officer

ROBERT GOTTSCHALK
Commissioner of Patents